United States Patent
May et al.

(10) Patent No.: US 8,855,807 B2
(45) Date of Patent: Oct. 7, 2014

(54) COMPUTER PROGRAM PRODUCTS FOR PACKAGING MACHINES SUITABLE FOR PACKAGING WHOLE MUSCLE

(75) Inventors: Dennis J. May, Pittsboro, NC (US);
Samuel D. Griggs, Raleigh, NC (US);
Matthew Lowder, Durham, NC (US);
William M. Poteat, Fuquay-Varina, NC (US); Derek L. Brown, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 968 days.

(21) Appl. No.: 12/966,273

(22) Filed: Dec. 13, 2010

(65) Prior Publication Data

US 2011/0083406 A1    Apr. 14, 2011

Related U.S. Application Data

(62) Division of application No. 12/507,856, filed on Jul. 23, 2009, now Pat. No. 7,870,707, which is a division of application No. 11/768,961, filed on Jun. 27, 2007, now Pat. No. 7,581,369.

(60) Provisional application No. 60/806,112, filed on Jun. 29, 2006.

(51) Int. Cl.
| | |
|---|---|
| *G06F 7/00* | (2006.01) |
| *B65B 57/00* | (2006.01) |
| *B65B 9/15* | (2006.01) |
| *B65B 51/04* | (2006.01) |
| *B65B 25/06* | (2006.01) |

(52) U.S. Cl.
CPC ............... *B65B 51/04* (2013.01); *B65B 57/005* (2013.01); *G06F 7/00* (2013.01); *B65B 9/15* (2013.01); *B65B 25/065* (2013.01)
USPC ................ 700/218; 53/417; 53/77; 53/138.4; 53/567; 53/576; 53/258; 452/31; 452/48

(58) Field of Classification Search
CPC ........ B65B 51/04; B65B 9/15; B65B 25/065; B65B 39/007; B65B 25/064; B65B 57/00; B65B 57/005; A22C 11/005; A22C 11/125
USPC ................ 53/417, 77, 138.2, 138.4, 567, 576, 53/258; 452/30, 31, 35, 48; 700/213, 218
See application file for complete search history.

(56) References Cited

U.S. PATENT DOCUMENTS

| | | |
|---|---|---|
| 1,218,314 A | 3/1917 | Read |
| 3,389,533 A | 6/1968 | Tipper et al. |
| 3,499,259 A | 3/1970 | Tipper et al. |

(Continued)

OTHER PUBLICATIONS

Tipper Tie Brochure "Automatic Netting & Packaging Machine Tipper Netter Model TN™ 2001" 2 pages (believed prior to Jun. 29, 2006).

(Continued)

*Primary Examiner* — Stephen F Gerrity
(74) *Attorney, Agent, or Firm* — Myers Bigel Sibley & Sajovec, P.A.

(57) ABSTRACT

Computer program products automatically package an object, such as, for example, whole muscle meat pieces, in a covering material, such as, for example, netting using actuators for operating barrier doors, pushers, and locks.

10 Claims, 21 Drawing Sheets

(56) References Cited

U.S. PATENT DOCUMENTS

| | | | | |
|---|---|---|---|---|
| 3,624,982 A | | 12/1971 | Marietta, Jr. | |
| 3,650,298 A | | 3/1972 | Delmar | |
| 3,662,514 A | | 5/1972 | Goss | |
| 3,732,113 A | | 5/1973 | Walters | |
| 3,802,337 A | | 4/1974 | St-Hiliare | |
| 3,805,480 A | | 4/1974 | Cherio et al. | |
| 3,827,210 A | | 8/1974 | Smalley et al. | |
| 3,954,171 A | | 5/1976 | Chick et al. | |
| 4,505,003 A | | 3/1985 | Becker et al. | |
| 4,537,006 A | | 8/1985 | Pieri | |
| 4,561,234 A | * | 12/1985 | Tonus | 53/417 |
| 4,625,362 A | * | 12/1986 | Kollross et al. | 53/576 |
| 4,676,153 A | | 6/1987 | Ast | |
| 4,683,700 A | | 8/1987 | Evans et al. | |
| 4,766,713 A | | 8/1988 | Evans | |
| 4,776,146 A | * | 10/1988 | Whitehouse | 53/58 |
| 4,901,625 A | * | 2/1990 | Bussan et al. | 91/361 |
| 4,958,477 A | | 9/1990 | Winkler | |
| 5,009,058 A | * | 4/1991 | Ptaschek et al. | 53/576 |
| 5,042,234 A | | 8/1991 | Evans et al. | |
| 5,154,543 A | | 10/1992 | Houck et al. | |
| 5,161,347 A | | 11/1992 | May et al. | |
| 5,203,261 A | | 4/1993 | Davis | |
| 5,241,800 A | * | 9/1993 | Steinke et al. | 53/55 |
| 5,495,701 A | | 3/1996 | Poteat et al. | |
| 5,519,985 A | | 5/1996 | Dyck et al. | |
| 5,586,424 A | | 12/1996 | Chen et al. | |
| 5,749,777 A | * | 5/1998 | Burch et al. | 452/149 |
| 5,765,337 A | * | 6/1998 | Lodewegen et al. | 91/361 |
| 5,954,323 A | * | 9/1999 | Emigh et al. | 53/77 |
| 6,729,102 B2 | | 5/2004 | Ailey et al. | |
| 7,124,553 B2 | | 10/2006 | Norton et al. | |
| 7,237,369 B2 | | 7/2007 | Griggs et al. | |
| 7,306,511 B2 | | 12/2007 | Whittlesey et al. | |
| 7,313,896 B2 | | 1/2008 | Griggs et al. | |
| 7,392,642 B2 | | 7/2008 | Topfer | |
| 7,467,993 B2 | | 12/2008 | Whittlesey et al. | |
| 2004/0035090 A1 | | 2/2004 | Thomsen | |
| 2004/0162705 A1 | * | 8/2004 | Grieb et al. | 702/185 |
| 2005/0034426 A1 | | 2/2005 | Griggs et al. | |
| 2005/0039419 A1 | | 2/2005 | Griggs et al. | |
| 2006/0105690 A1 | | 5/2006 | Wince et al. | |
| 2006/0220844 A1 | * | 10/2006 | Flanders | 340/540 |
| 2006/0272710 A1 | * | 12/2006 | Minervini et al. | 137/487.5 |
| 2009/0075576 A1 | | 3/2009 | Whittlesey et al. | |

OTHER PUBLICATIONS

Tipper Tie Brochure "Have it your way!" for Model 2250, 2 pages (1994).

* cited by examiner

US 8,855,807 B2

COMPUTER PROGRAM PRODUCTS FOR PACKAGING MACHINES SUITABLE FOR PACKAGING WHOLE MUSCLE

RELATED APPLICATION

This application is a divisional of U.S. patent application Ser. No. 12/507,856, filed Jul. 23, 2009, now U.S. Pat. No. 7,870,707, which is a divisional of U.S. patent application Ser. No. 11/768,961, filed Jun. 27, 2007, which issued as U.S. Pat. No. 7,581,369 on Sep. 1, 2009, which claims priority to U.S. Provisional Application Ser. No. 60/806,112, filed Jun. 29, 2006, the contents of which are hereby incorporated by reference as if recited in full herein.

FIELD OF THE INVENTION

The present invention relates to apparatus that can package and apply closure clips to materials that enclose products therein, and may be particularly suitable for enclosing discrete pieces of whole muscle in clipped netting material.

BACKGROUND OF THE INVENTION

Certain types of commodity and/or industrial items can be packaged by placing the desired product(s) in a covering material, then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material. For example, the systems include a netting chute that holds a length of a netting sleeve over the exterior thereof. A first downstream end portion of the netting is typically gathered and clipped closed using a first clip. As the product exits the netting chute, it is covered with the netting. The trailing edge of netting can be gathered (upstream of the product) and clipped, typically using a Tipper Tie® single or double clipper apparatus. A clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

Other systems and devices provide for semi-automated or automated clipping as described in U.S. patent application Ser. No. 10/339,910 (now U.S. Pat. No. 6,729,102) and co-assigned, U.S. patent application Ser. No. 10/951,578 (now U.S. Pat. No. 7,313,896) and Ser. No. 10/952,421 (now U.S. Pat. No. 7,237,369), the contents of which are hereby incorporated by reference as if recited in full herein. U.S. patent application Ser. No. 10/339,910 describes a device with a chute that is configured to package a product, such as a vacuum-packed turkey, and can also form a handle in a tubular covering encasing the product.

SUMMARY OF EMBODIMENTS OF THE INVENTION

Embodiments of the present invention provide apparatus, subassemblies and/or other devices, systems, methods and computer program products for automatically or semi-automatically packaging a product in a covering material, such as, for example, netting, and applying clips thereto.

Some embodiments are directed to systems for enclosing at least one product in netting. The systems include: (a) a mounting frame; (b) a first elongate product chute with a loading door configured to allow an operator to place target products therein, the first product chute attached to the mounting frame; (c) an elongate netting chute having an outer surface and opposing receiving and discharge end portions with an interior cavity extending therethrough, the netting chute having an axial centerline, wherein the elongate netting chute is pivotably attached to the mounting frame; (d) a second elongate product chute having opposing receiving and discharge ends, residing at least partially in the interior cavity of the netting chute and pivotably attached to the mounting frame, wherein, in operative position, the second product chute is axially aligned with and resides downstream of the first product chute, and wherein, the netting chute and the second product chute are configured to pivot together from an axially aligned position to a laterally offset netting sleeve reloading position; (e) a product pusher mechanism with a pusher head that is configured to have a product pushing cycle to automatically reciprocally travel into and out of the first and second product chutes to thereby advance a product through the first product chute, then the second product chute and out of the discharge end portion of the second product chute; and (f) a clipper mechanism disposed downstream of the netting chute in cooperating alignment therewith, the clipper mechanism configured to apply at least one clip to a netting material that encloses the product after the product exits the first product chute.

Other embodiments are directed to methods of packaging discrete objects in netting. The methods include: (a) automatically pushing at least one object through first and second axially aligned product chutes; (b) pulling netting material from an exterior surface of a netting chute residing about the second product chute to automatically enclose the object in the netting material as the object exits the second product chute; (c) applying at least one clip to the netting material to secure the object in the netting material; and (d) pivoting the netting chute and second product chute together to load a sleeve of netting material onto the netting chute.

Yet other embodiments are directed to methods of packaging discrete pieces of whole muscle in netting. The methods include: (a) automatically extending a member between a first product chute and a pusher head of an automated pushing mechanism to inhibit the pusher head from axially extending into the first product chute; (b) receiving discrete pieces of whole muscle in a loading chamber of a first product chute when the locking gate is extended; (c) locking the loading chamber closed after the receiving step; then (d) automatically retracting the member to allow the pusher head to enter the first product chute; and (e) automatically pushing the discrete pieces of whole muscle through the first product chute after the locking and retracting steps.

In some embodiments, the pushing step includes pushing the discrete pieces of whole muscle through a second axially aligned and spaced apart product chute disposed downstream of the first product chute such that a substantially circumferentially extending gap space resides therebetween.

Other embodiments are directed to computer program products for operating an automated or semi-automated netting system. The computer program product includes a computer readable storage medium having computer readable program code embodied in the medium. The computer-readable program code includes: (a) computer readable program code that monitors at least one signal from respective first and second safety valves in communication with pressurized air supplied to the netting packaging system that includes a plurality of pneumatically actuated members; and (b) computer readable program code that automatically cuts off the pressurized air to the system if one or both of the safety valves is determined to be inoperable based on the monitored signals.

Still other embodiments are directed to systems for enclosing at least one product in netting. The systems include: (a) a first elongate product chute with a loading door configured to allow an operator to place target products therein; (b) an elongate netting chute having an outer surface and opposing receiving and discharge end portions with an interior cavity extending therethrough; (c) a second elongate product chute having opposing receiving and discharge ends, residing at least partially in the interior cavity of the netting chute whereby the second product chute and the netting chute are substantially coaxially aligned, wherein, in operative position, the second product chute is axially aligned with and resides downstream of the first product chute, and wherein, the netting chute and the second product chute are configured to pivot together from an axially aligned position to a laterally offset netting sleeve reloading position; and (d) a product pusher mechanism with a pusher head that is configured to have a product pushing cycle to automatically reciprocally travel into and out of the first and second product chutes to thereby advance a product through the first product chute, then the second product chute and out of the discharge end portion of the second product chute.

These and other objects and/or aspects of the present invention are explained in detail in the specification set forth below.

DESCRIPTION OF EMBODIMENTS OF THE INVENTION

Figure 1:
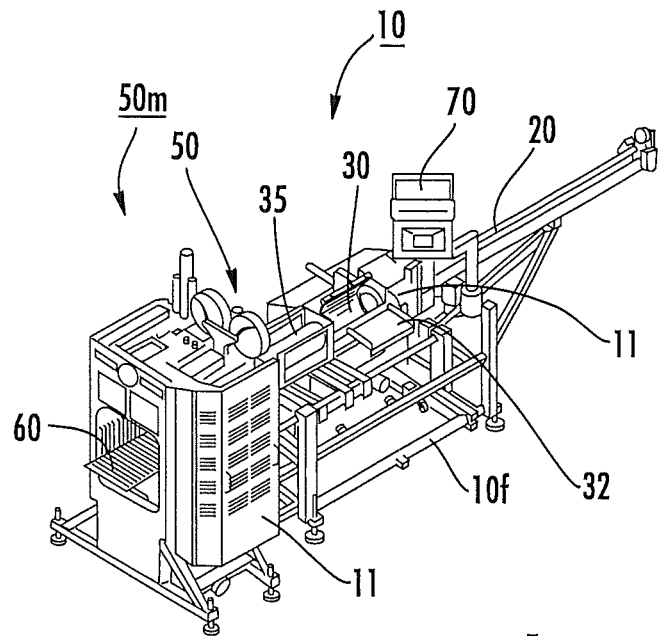
FIG. 1 is a perspective discharge end view of an apparatus/system used to automatically advance objects through a product chute and then automatically apply at least one clip according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain tutus are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame may be one integral structure or a plurality of individual structures mountable to each other or a common floor structure or the like. The term "modular" means that a subassembly is designed with standardized dimensions, mounting features and/or configurations for interchangeable use with replacement modules of the same or similar type and/or other selected different modules. The frame and selected modules may also be configured for selectable mounting on a right or left hand side of a common frame or certain modules maybe configured for use with more than one packaging system. The terms "actuator" or "actuation cylinder" and derivatives thereof are used generically to indicate any type of automatically moveable actuation member.

The present invention is particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, and the like, as well as inanimate objects. Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, particular embodiments of the present invention are directed at automating the packaging of discrete pieces of whole muscle meat product by automatically pushing pieces of the whole muscle (concurrently) through a product chute and wrapping or enveloping the objects at the other end of the chute directly in netting (e.g., "open net", so that the whole muscle therein is exposed to environmental conditions), then automatically or semi-automatically clipping the covering material with a closure clip or other attachment means to close the covering and hold the object or objects inside of the covering material. The netted whole muscle may be in a single package or may be packaged in a series of linked packages (such as similar to "chubs"). The whole muscle may be processed so that protein migrates to or resides proximate an outer surface so that adjacent pieces of whole muscle may combine, attach, and/or bind when held in the netting during subsequent processing, without requiring any compression of the whole muscle during packaging in the netting. Where linked, the space between the actual netted product can be packaged with sufficient length to allow exposure (non-contact between adjacent netted product links) of adjacent ends of the netted whole muscle to processing conditions (such as smoke from a smoker).

Alternatively, product can be sealed or packaged in collagen or other casing material before (or after) it is enclosed in netting.

FIGS. 1-5 illustrate an exemplary automatic clipping packaging apparatus 10 according to embodiments of the present invention. As shown, the apparatus 10 may include a product pusher assembly or mechanism 20, a loading chute 30, a product chute 35, a netting chute 40, a derucker 45, a clipper 50, and an optional discharge roller table 60. The netting chute 40 is configured to receive a discharge end portion of the product chute 35, and typically resides about at least a minor portion of the length of the product chute 35 so that the netting chute and product chute are coaxially aligned (i.e., have substantially common centerlines) with the netting chute 40 enclosing a length of the product chute 35.

Figure 7:
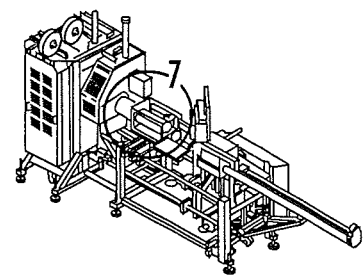
FIG. 7 is an enlarged view of the horns and an exemplary derucker, illustrated without the derucker guard shown in FIG. 1, according to embodiments of the present invention.
Figure 7:
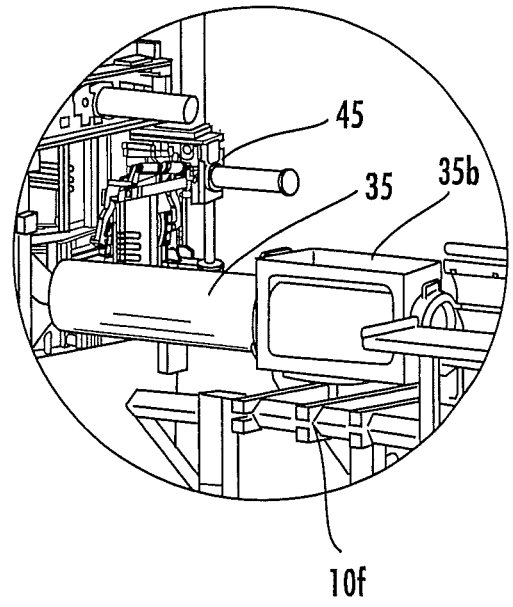
Figure 8:
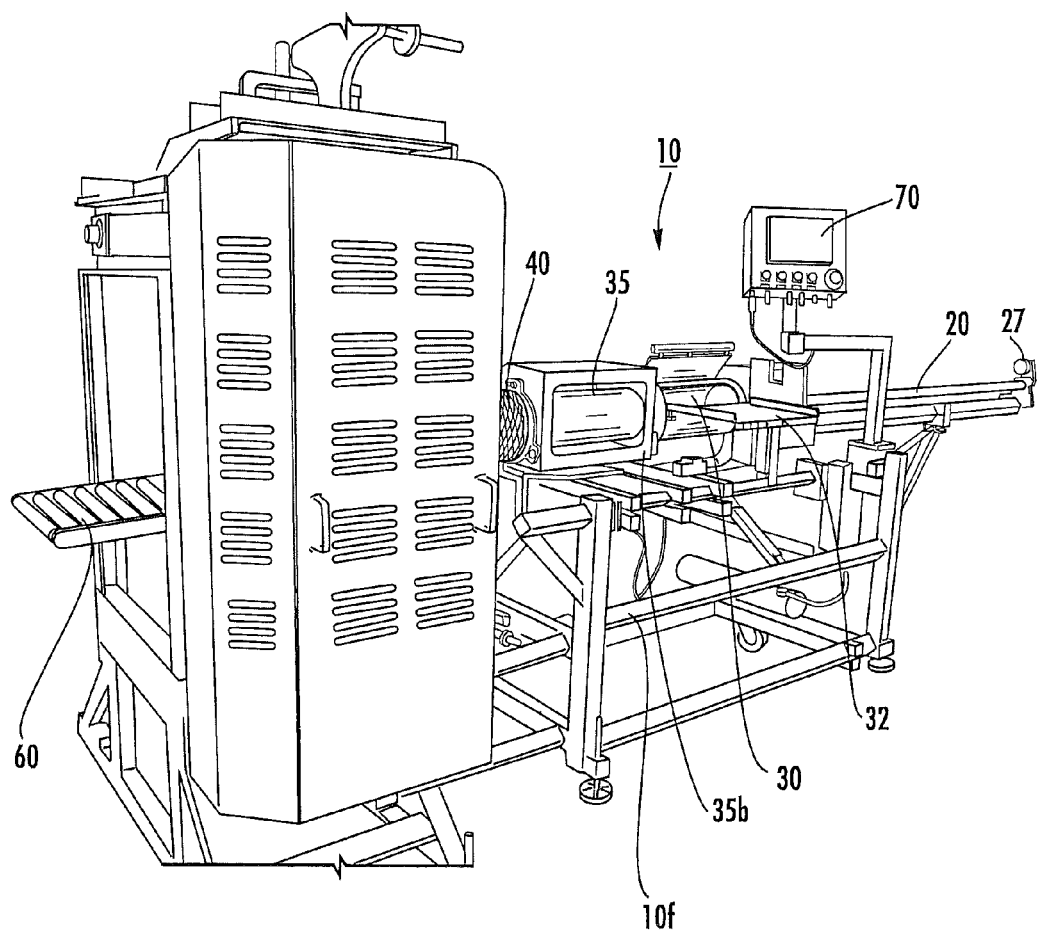
FIG. 8 is a discharge end perspective view of the device shown in FIG. 1 with a netting chute loaded over a product chute and in position for accepting operating loading of product from the side according to embodiments of the present invention.

FIGS. 7 and 8 illustrate that the product chute 35 can be mounted to a bracket 35*b* that is mounted to the frame 10*f* and is configured to be able to laterally move, (typically via rotating), relative to the frame 10*f*. As shown, for example, in FIG. 19, the bracket 35*b* includes spaced apart connectors 38 that allow the netting chute 40 to releasably mount thereto. The connectors 38 can have a quick-connect configuration, such as projections that releasably accept and mate to asymmetrically configured aperture shapes with a larger area merging into a smaller locking area in a bracket 40*b* on a forward end of the chute 40 whereby an operator can slide, then turn the netting chute 40 to lock it in position on the connectors 38. See, e.g., FIG. 18, which shows apertures 35a having a similar configuration for mounting the chute 35 to bracket 35b. For additional description, see U.S. patent application Ser. No. 11/262,600, the contents of which are hereby incorporated by reference as if recited in full herein.

Figure 16:
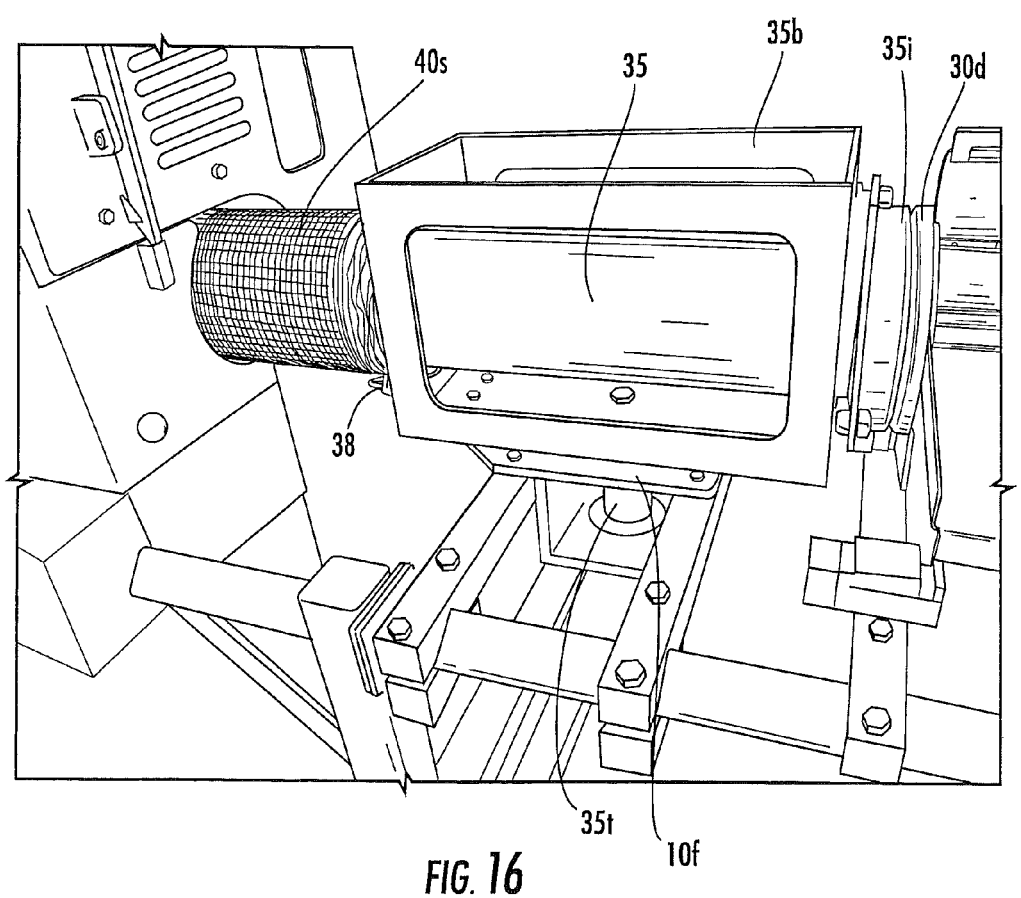
FIG. 16 is a side view of the product chute downstream of the loading chute according to some embodiments of the present invention.
Figure 18:
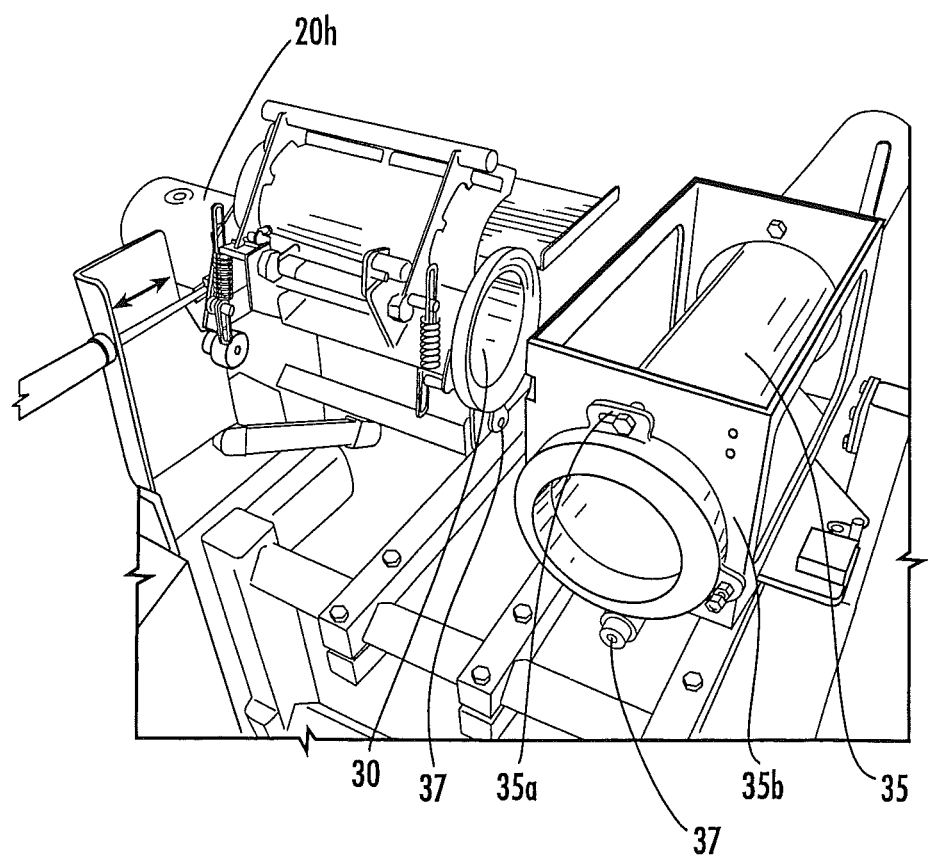
FIG. 18 is a side view of a portion of the device shown in FIG. 1, illustrating that the product chute can be configured to pivot or rotate out of operational alignment to allow ease of access for loading netting or other service access according to embodiments of the present invention.
Figure 19:
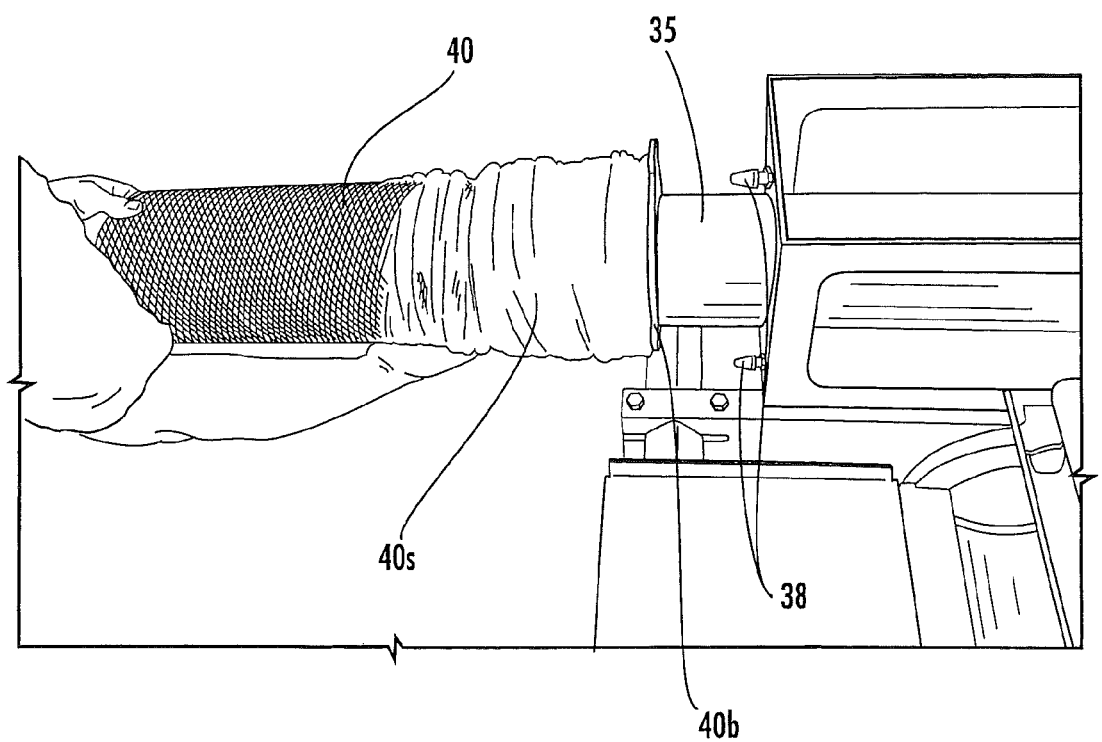
FIG. 19 is a side view of the product chute region of the device shown in FIG. 18 illustrating loading of a netting chute having a sleeve of netting thereon while the product chute is out of operational alignment according to embodiments of the present invention.

As also shown in FIGS. 18 and 19, the netting chute 40 and product chute 35 can be configured to move in concert (typically via pivoting) away from the axially aligned operative position for service access, such as to reload sleeves of netting or different netting chutes. As shown in FIGS. 16 and 18, the product chute bracket 35b can be mounted to the frame 10f at an underside of the bracket 35b via a rotating arm 35t. Other mounting configurations may be used, such as a suspension mounting system, or a sliding table, or the like. The translation of the chute 35 can be controlled using sensors and actuation cylinders so that an operator cannot inadvertently move the components from operative alignment during active use and so that "normal operation" is precluded when the chutes 30, 35 are misaligned from the pusher head 20h. FIG. 18 illustrates that the product chute 30 can translate to a position that is about 90 degrees offset from the in-line configuration. In other embodiments, the translation can be between about 30-160 degrees (not shown). FIG. 19 illustrates that a new or "re-loaded" netting chute 40 can be slid over the product chute 35 and mounted to bracket 35b ready to be rotated and/or slid back into axial alignment.

FIG. 18 also illustrates that sensors 37, such as proximity switches, can be placed on adjacent portions of the chutes 30, 35 and, upon realignment on the frame (rotating back into axial alignment), the sensors 37 can be monitored to confirm proper orientation before allowing activation of the system 10. No lock, brace or bracket is required to hold the two chutes in alignment due to the positioning of the two chutes and the locking of the chute 35 into operative position via at least one lower (underneath) locking member via frame 10f. For example, a mechanical and/or electromechanical locking member can engage arm 35t and/or an automated magnetic or other locking member can attach the chute 35 to frame 10f in the desired operative orientation to provide suitable stability. Alternatively, a locking bracket between the two chutes 30, 35 may be used to buttress the operative alignment in some embodiments (not shown). The chute 35 may be biased to reside in one of two positions (the loading and the operative positions) and may be configured to travel to and from those positions in an automated manner without requiring manual labor, but may travel upon user input via an HMI or other input device.

The clipper 50 may be configured as a clipper voider module 50m that can be modular in design in that it can operate with other packaging systems such as the TN 2001 sold by Tipper Tie, Inc., of Apex, N.C. The modular clipper module 50m can matably attach to the frame 10f of the system to maintain operational alignment. Features and operation of clipper and voiders are well known to those of skill in the art. Although shown as with a pivoting clipper, other clipper designs may be used. The system 10 can include a controller 70 with a user input (which can be configured as a Human Machine Interface ("HMI")).

Figure 14:
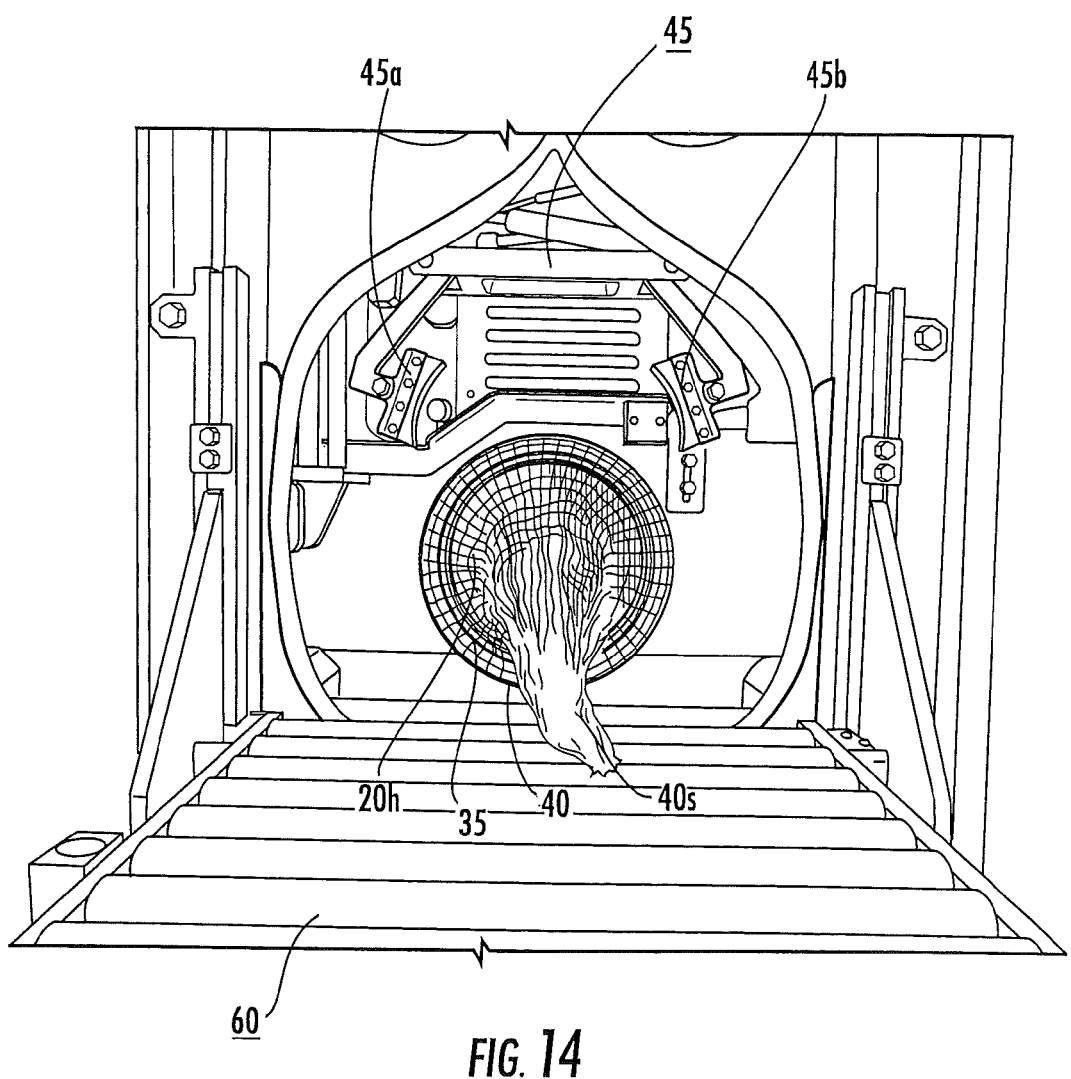
FIG. 14 is a discharge end view of the system shown in FIG. 1, illustrating the pusher head approaching the exit end of an internal product chute held inside a netting chute according to some embodiments of the present invention.

As shown in FIGS. 7 and 16, the derucker 45 may be configured to mount to the frame 10f of the apparatus 10 and cooperate with the netting chute 40 so that the derucker 45 can automatically retract and extend to pull lengths of the sleeve material 40s (FIG. 16) in a downstream direction proximate the egress portion of the netting chute 40. The derucker 45 can be in communication with a controller 70 such as the HMI (Human Machine Interface) as will be discussed further below. The derucker 45 can also be configured to act as a braking assembly that pinches the netting against the chute 40 at desired intervals, such as during a voiding/clipping operation. The derucker 45 can be configured to automatically switch between a derucker operation mode and a braking operation mode. As shown in FIG. 14, the derucker 45 is configured to controllably move two arms 45a, 45b in concert, typically both vertically and horizontally, about respective slide assemblies. Additional description of the derucker 45 can be found in co-pending U.S. patent application Ser. No. 11/262,600, the contents of which are hereby incorporated by reference as if recited in full herein.

The discharge roller table 60 can include translatable holding flaps (not shown) as described in co-pending U.S. application Ser. No. 10/952,421, the contents of which are hereby incorporated by reference as if recited herein. However, it is noted that other discharge or product receiving configurations may be used, such as, but not limited to, conveyors rather than rollers as well as static discharge floors (not shown). Generally described, the flaps can move together to trap product during clipping then move apart.

Figure 2:
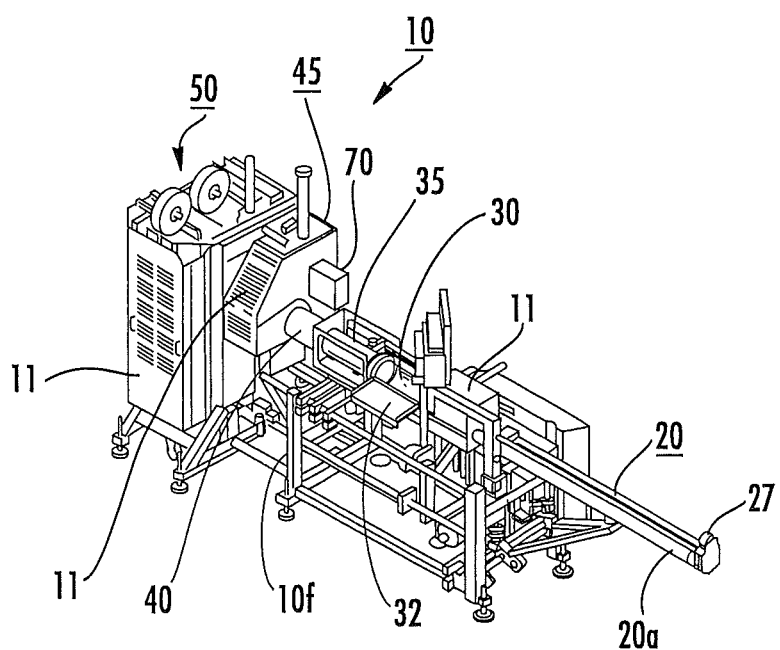
FIG. 2 is a perspective pusher end view of the apparatus/system shown in FIG. 1.
Figure 3:
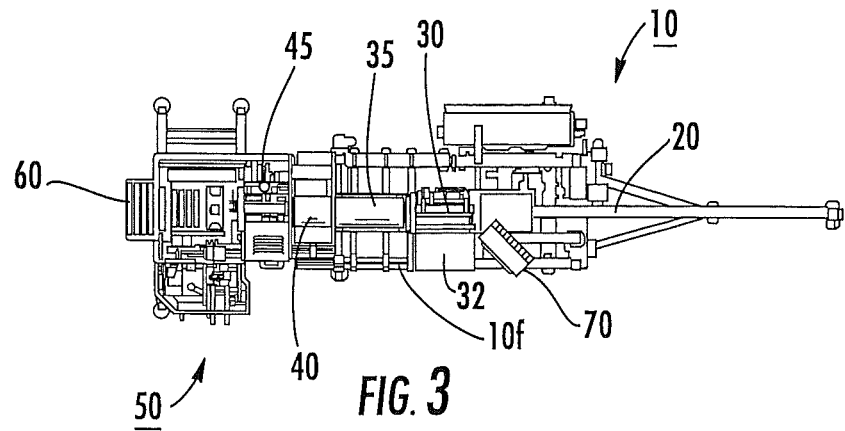
FIG. 3 is a top view of the apparatus shown in FIG. 1.
Figure 4:
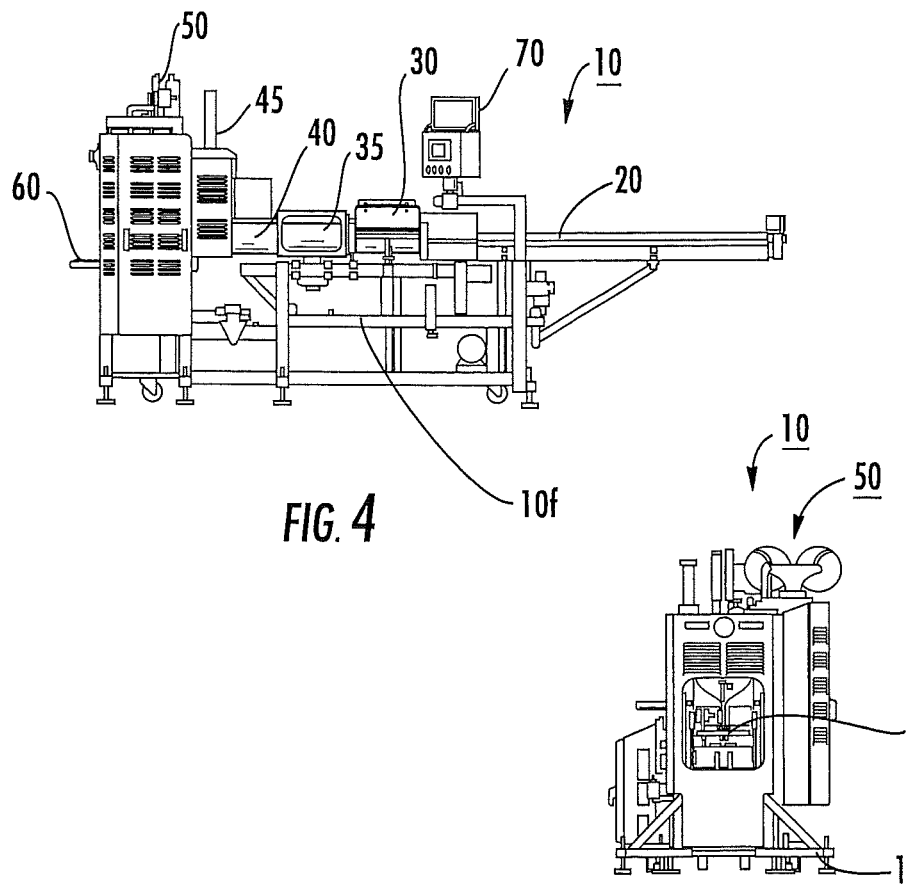
FIG. 4 is an operator side view of the apparatus shown in FIG. 1.
Figure 5:
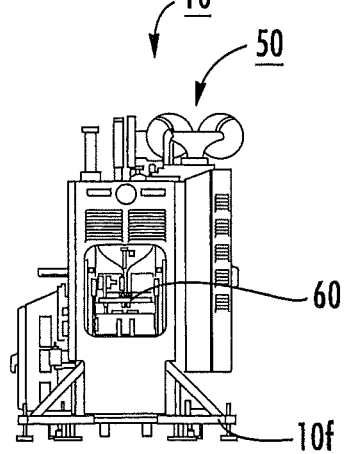
FIG. 5 is a discharge end view of the device shown in FIG. 1.
Figure 6:
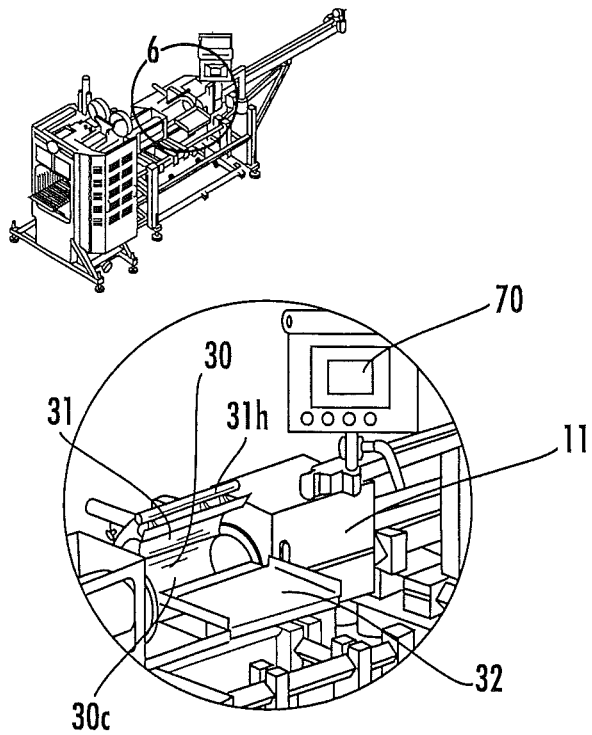
FIG. 6 is an enlarged side perspective view of an operator input region of the device shown in FIG. 1.

It is noted that the clipper 50 may be referred to herein as a clipper apparatus, clipper module, clipper mechanism, and/or clipper assembly, but each term may be used interchangeably with the others. As shown, the apparatus 10 may optionally include a side table 60. Optionally, the apparatus 10 may also include a handle maker (not shown). FIGS. 1 and 2 illustrate the apparatus 10 with examples of housing guards 11 disposed over certain functional components to inhibit operator contact with moving components. As noted above, clippers and clipper modules are available from Tipper Tie, Inc., of Apex, N.C. Examples of suitable clips include metallic, generally "U"-shaped clips available from Tipper Tie, Inc., in Apex, N.C. Other clips, clip materials and clip configurations or closure means may also be used.

As shown in FIGS. 1-5, the clipper 50 can be pivotably mounted at a pivot 50p to a frame and sized and configured to automatically and controllably actuate (via a pneumatic or fluid cylinder) to advance into a clipping position after the product is in position downstream thereof, then clip the covering material and retract to await to clip the next covering material for the next enclosed product. The clipper 50 may operate in response to data from a proximity sensor that is positioned to detect when a product is ready for clipping and provide the data to a controller or processor. The proximity sensor may be positioned at any suitable place to indicate when the product is in position or when the pusher head approaches. The proximity sensor can be an optical sensor (infrared, photosensor, or the like), a hall-effect sensor, a magnetic sensor, an inductive sensor, and/or any other suitable sensor. The clipper 50 can be attached to a clipper rotation rotary actuator that can control the movement of the clipper 50 during use. In other embodiments, the clipper 50 may be a stationary mounted clipper (non-pivoting).

In some embodiments, the apparatus 10 may include a voiding mechanism (also known as a "voider") that cooperates with the clipper mechanism 50 and handle maker (where used) to help gather and "void" the casing or covering material prior to clipping. As is well known to those of skill in the art, the voiding mechanism can include a pair of spaced apart gates that can move together and apart, each with a window that converges upon the covering material that is held in tension therethrough, to force excess product out of the clipping area/volume, as is well known to those of skill in the art. The voider or voiding mechanism may help provide a tighter clipped package.

In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. For example, the chute 30 and/or the chute 35 may be configured to incline.

In operation, an operator can manually place pieces of product that may be pre-positioned on a side table 32, then in the loading chute 30. Alternatively, automated loading may also be used (not shown). The product pusher assembly 20 can linearly retract and advance a pusher head 20h (FIGS. 10-15) to push a product through the product chute 35 so that the product is enclosed in netting 40s, then positioned proximate the clipper 50. The product pusher head 20h then retracts to a resting "home" position upstream of the loading chute 30. When the product exits the product chute 35, it is encased/held in the covering material as the covering material is drawn downstream. The clipper then operates so that the covering material may be clipped, welded, fused, knotted or otherwise closed and/or sealed at leading and trailing edge portions thereof.

Figure 11:
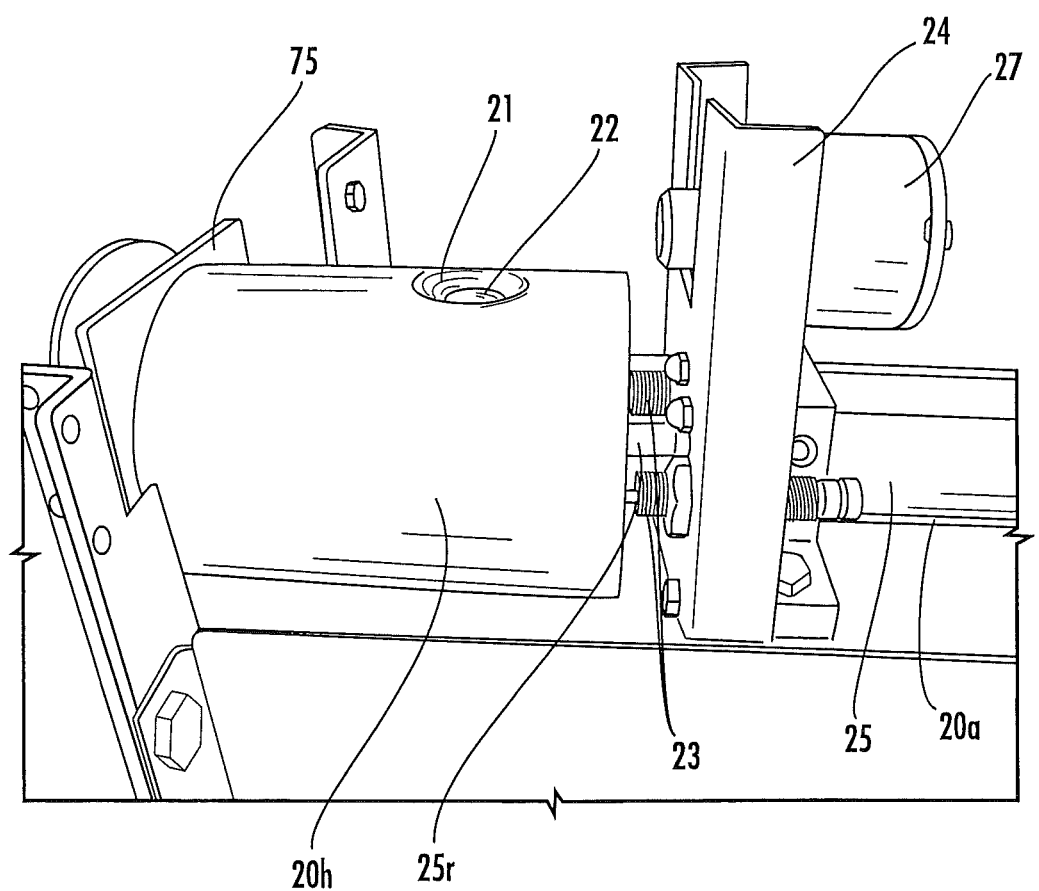
FIG. 11 is a side view of a portion of the device shown in FIG. 1 illustrating an automated pusher head behind a safety gate according to embodiments of the present invention.
Figure 15:
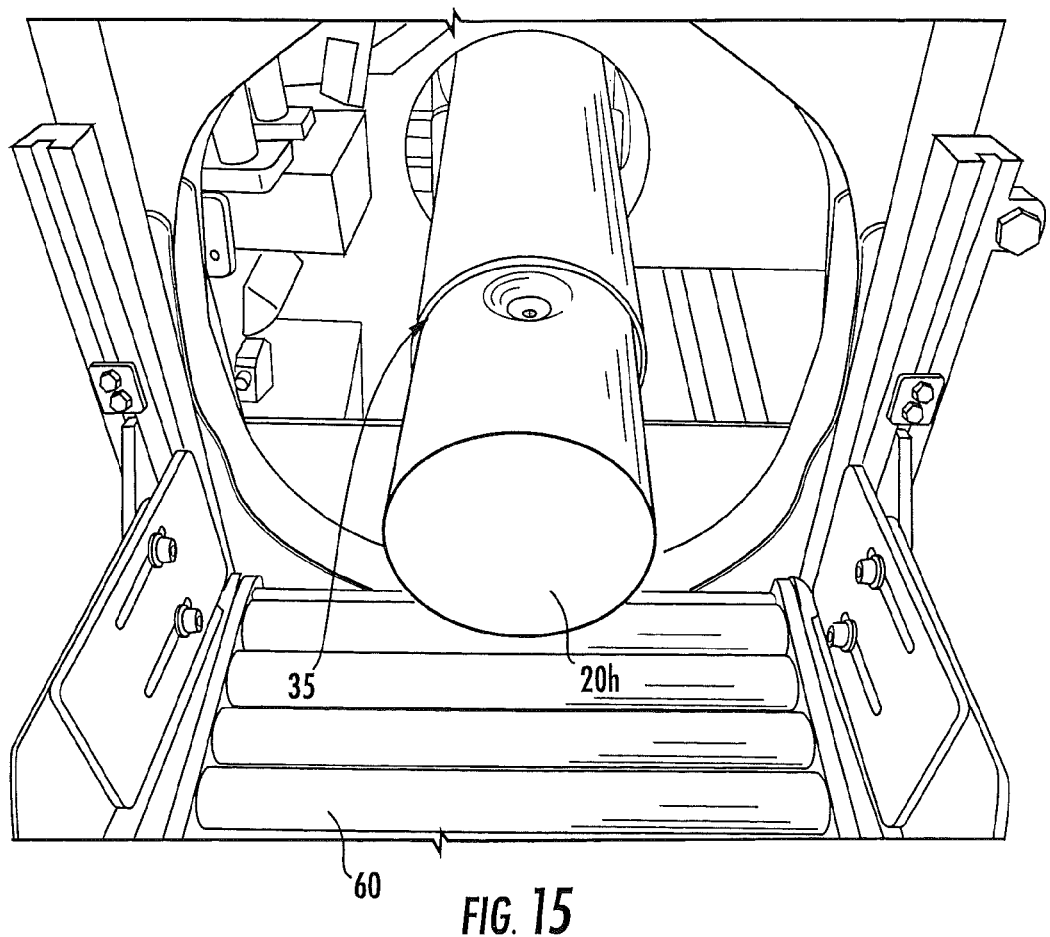
FIG. 15 is a perspective end view of the discharge end view of the system similar to that shown in FIG. 14, illustrating the pusher head exiting the product chute and the netting chute removed according to some embodiments of the present invention.

Thus, once the product is loaded, the pusher mechanism 20 actuates to automatically cause the pusher head 20h to travel through a product pushing cycle that includes reciprocally moving (extending then retracting) the pusher head 20h between a forwardmost position where the pusher head 20h extends out of the product chute 35, typically at least about 2-4 inches, and more typically greater than a major portion of the length of the pusher head body, such as for example between about 6-8 inches as shown for example in FIG. 15 (a home position as shown for example in FIG. 11).

Figure 17:
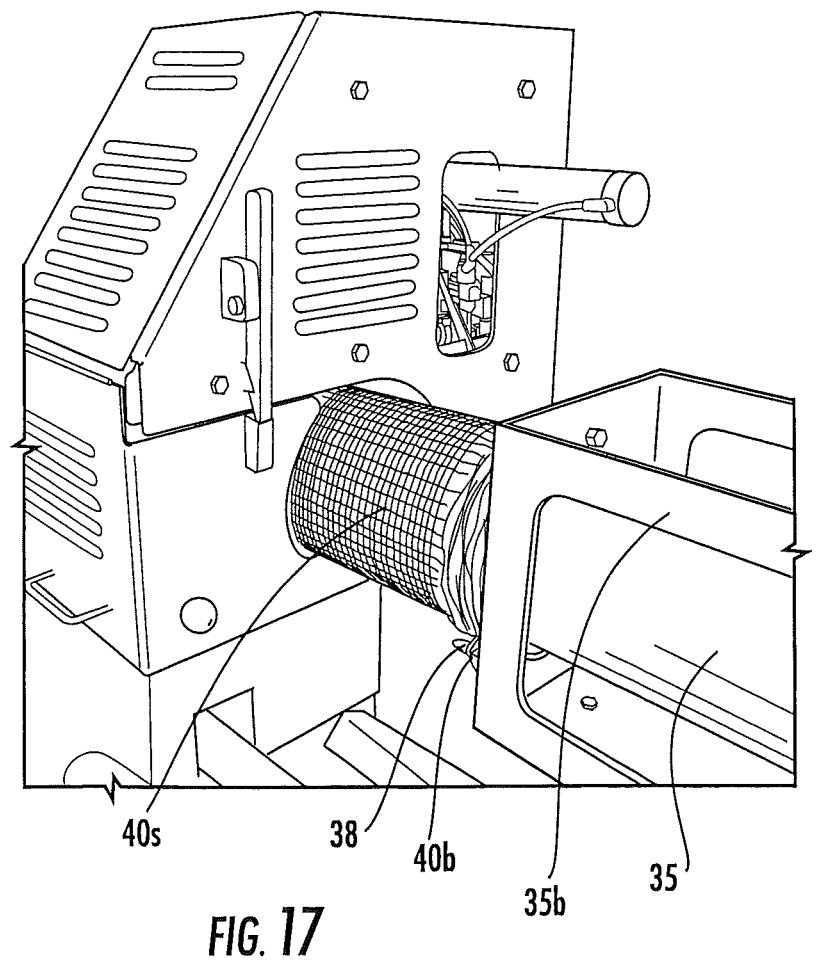
FIG. 17 is a side perspective view of the product chute and netting chute and clipper module according to embodiments of the invention.

As described above, a sleeve of covering material (designated at 40s in FIGS. 16 and 17) can be positioned about the external surface of the netting chute 40 and configured to be drawn downstream thereof so as to automatically encase the product as the product emerges from the discharge end 35d of the product chute 35. A supplemental sleeve material holder may also be used if desired instead of placing the sleeve of casing material on the netting chute (not shown). The supplemental sleeve holder can be configured to surround a downstream portion of the product chute 35. The sleeve of covering material may be sized to stretch to substantially conform to the external wall or surface of the product chute 35 or may be more loosely held thereon. The cavity 35c of the loading chute 30 and/or the product chute 35 can be substantially the same and define a constant interior cavity size, the product may be loaded to snugly contact or squeeze opposing portions of the product (side to side and/or top to bottom) as the product is pushed therethrough, or the product may be undersized with respect to the chute(s) and remain substantially uncompressed (i.e., the chute cavity may be oversized with respect to the product) as the product travels therethrough.

Figure 12:
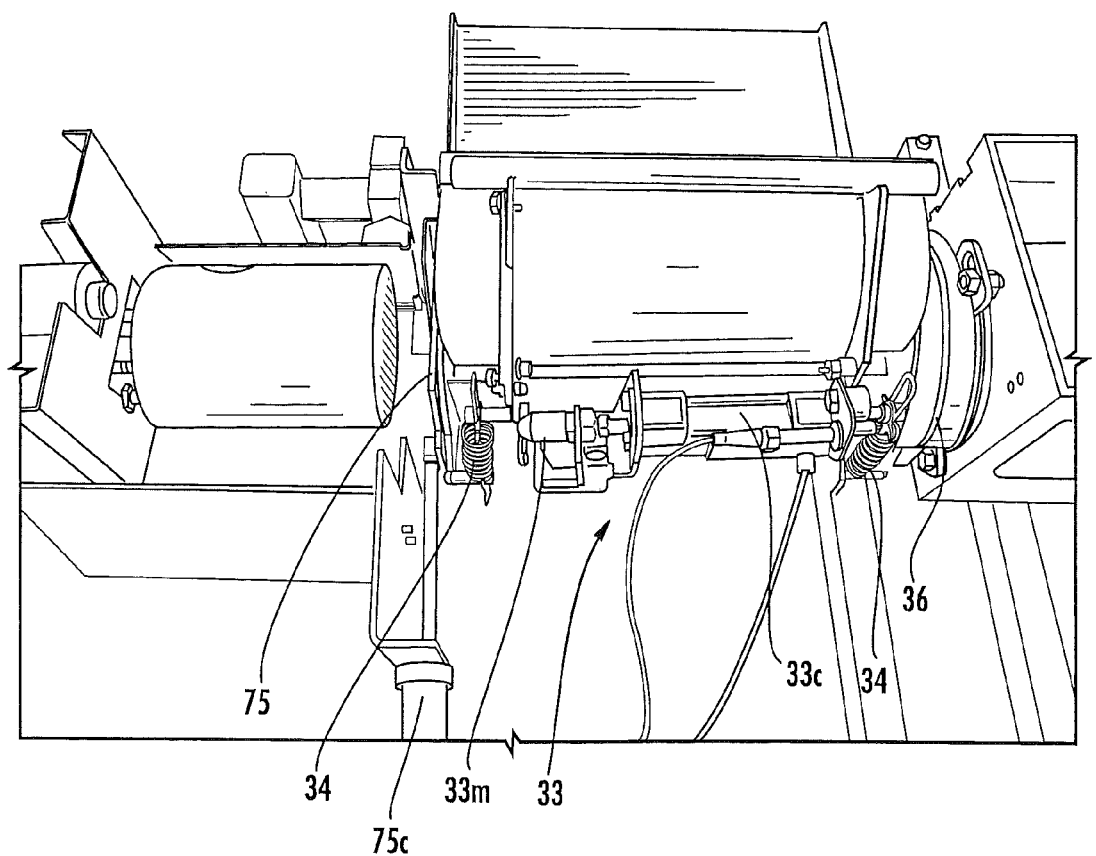
FIG. 12 is a top perspective view of the region of the device shown in FIGS. 9-11, illustrating a non-actuated pusher head, a loader locking system and the safety gate according to some embodiments of the present invention.

FIGS. 6, 8-10 and 12 show that the loading chute 30 can include a loading door 31 with a handle 31h that opens to expose the interior cavity 30c. An operator can place pieces of whole muscle or other product in the cavity 30c, then close the loading door 31. The system 10 can monitor a sensor that detects when the door 31 is closed and the system 10 can automatically activate a locking mechanism to positively lock the door 31 closed, once the closed door is detected and before the pushing cycle is initiated. In the embodiment shown in FIGS. 10 and 12, the locking mechanism 33 includes a pneumatic actuation cylinder 33c and a locking member 33m. The locking actuation cylinder 33c axially translates in an upstream direction to extend the member 33m into a locking bracket to lock the door 31 closed. The door 31 can be in communication with biasing springs 34 as shown in FIG. 12 to bias the door to reside in an open configuration when unlocked.

Figure 9:
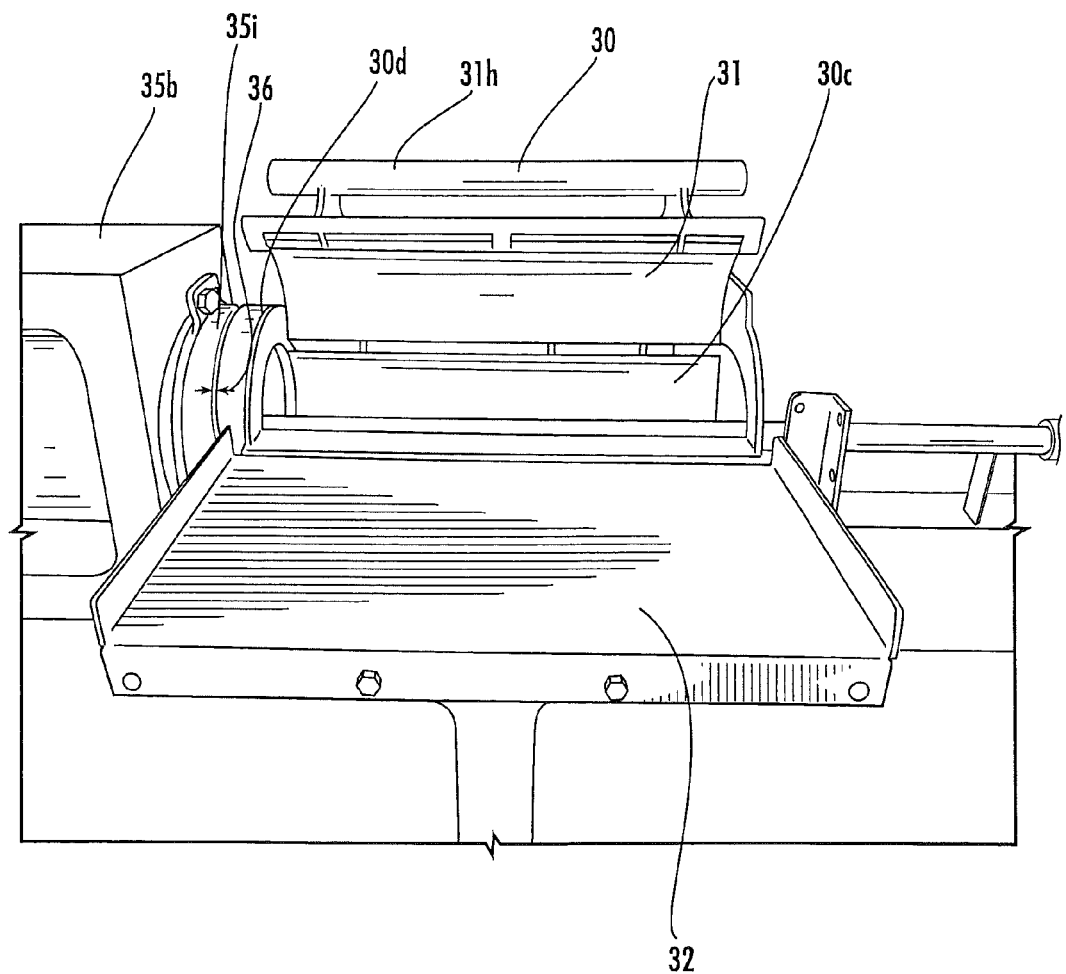
FIG. 9 is a side view of a loading region of the device shown in FIG. 1 with a side shelf and an open loading chamber in alignment with an upstream product chute according to some embodiments of the present invention.
Figure 10:
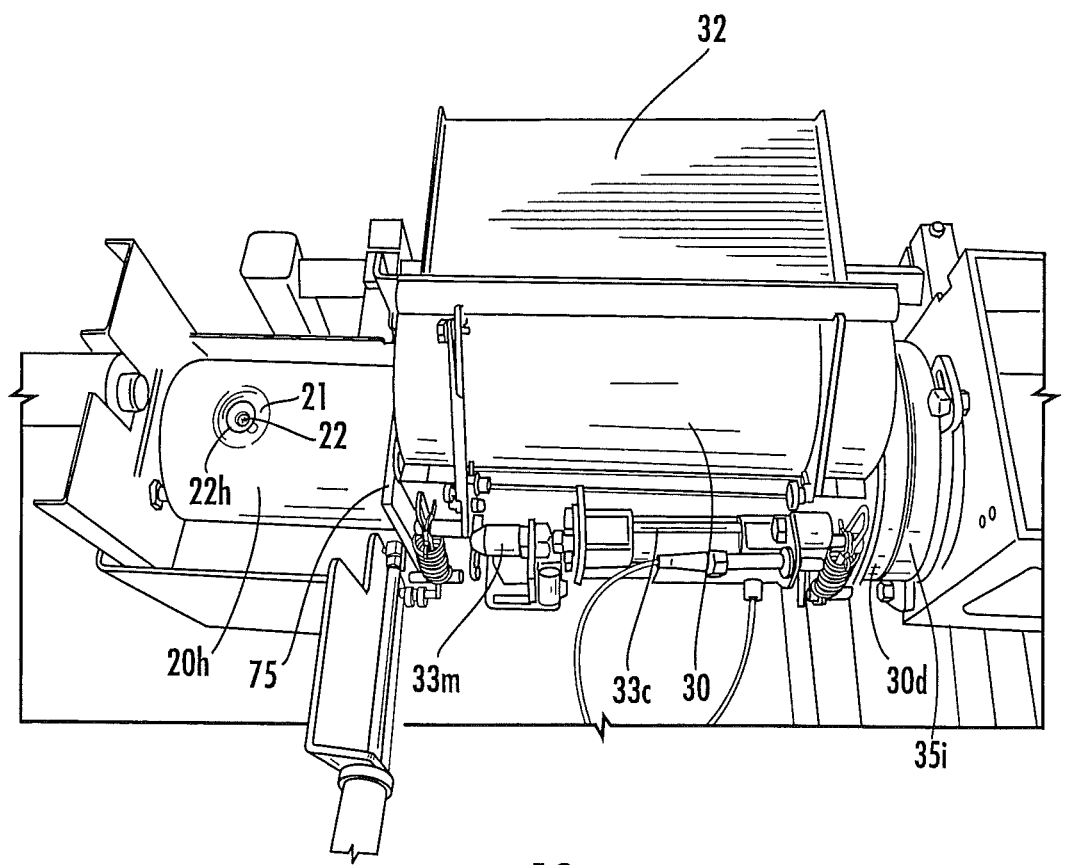
FIG. 10 is a top perspective view taken from an opposing side, of the region of the device shown in FIG. 9.

FIGS. 9 and 12 illustrate that the chutes 30, 35 can be axially aligned by being spaced apart by a relatively small gap space 36, such as between about 0.001-0.5 inches, and typically between about 0.1 to about 0.125 inches. As also shown, the proximate portions of the respective chutes 30d, 35i can include non-metallic collars, typically elastomeric collars, and more typically relatively rigid polymeric collars such as DELRIN® collars. In other embodiments, the two chutes 30, 35 may snugly abut each other and, in yet other embodiments, the two chutes 30, 35 may be sealed together. In some embodiments, the chutes 30, 35 may optionally include replaceable collars/inserts at the junction of the two chutes to allow repair or wear that may occur over long use periods due to rotation and positioning of the chutes from loading and unloading configurations (not shown).

FIGS. 10-13 illustrate the pusher mechanism 20 with pusher head 20h. As shown, for example, in FIG. 10, the pusher head 20h can be releasably attached to the reciprocally translatable actuation rod 25r via an attachment member 22 with a head 22h that resides in a recess 21 that merges into a channel formed in the head 20h so that the head 22h is beneath the outer surface of the head and does not inhibit sliding (i.e., it does not contact the chute cavity walls). The attachment member 22 can be any suitable device such as a screw, pin, nail or the like. The recess 21 and associated channel can reside closer to the rear and on an upper portion of the head 20h as shown. Alternatively, the recess 21 and channel may be formed in a side and/or closer to the front of the pusher head, typically at a location that allows ease of operator access to be able to remove the head for cleaning and/or replacement or repair.

Still referring to FIGS. 10-13, as shown, the pusher head 20h may be a substantially rigid elastomeric body, such as a rigid polymer, copolymer or derivative thereof, and may be formed of DELRIN® polymer. The external surface of the pusher head 20h and/or the inner walls of the chutes 30, 35 may comprise food compatible lubricants or coatings such as TEFLON® polymer.

Figure 13:
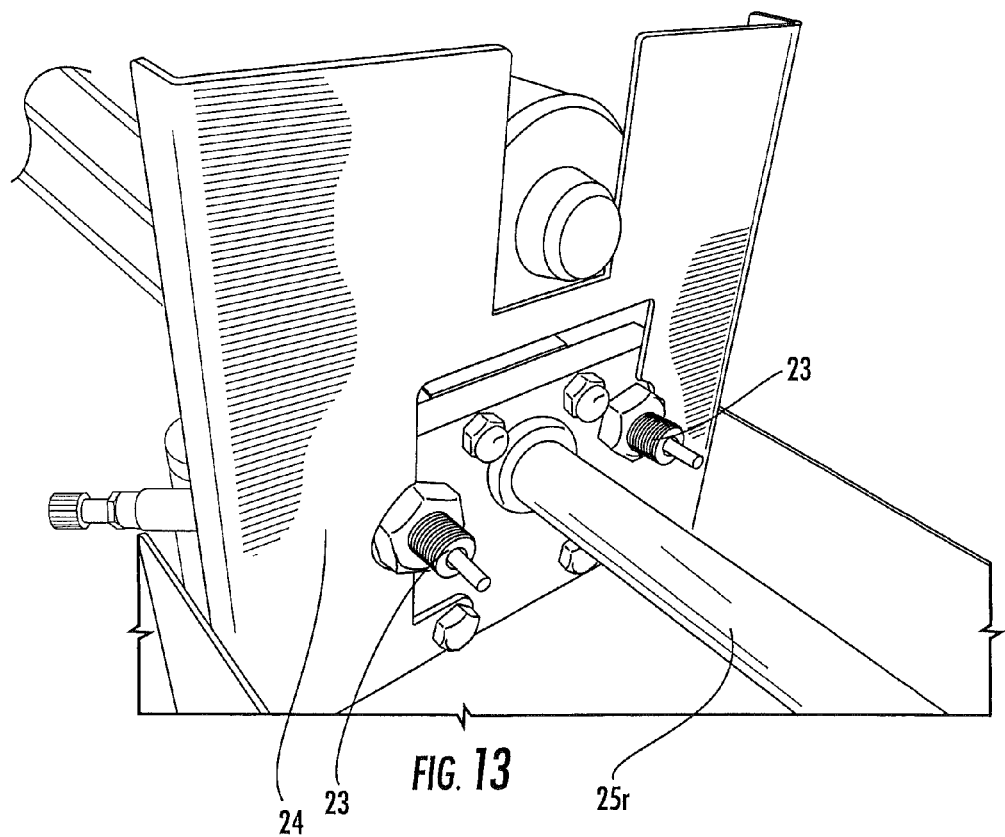
FIG. 13 is a side perspective view of an actuated pusher head illustrating shock absorbers that may be used to allow improved operational efficiencies of the pusher head (upon retraction) according to some embodiments of the present invention.

The pusher mechanism 20 can be configured to have a relatively fast pushing cycle and may be able to carry out between about 8-12, typically about 10, cycles per minute. As shown in FIGS. 11 and 13, to facilitate fast retraction, shock absorbers 23 may be used to reduce forces between the system frame 10f and the pusher head 20h as it travels to its home or "rest position". As shown, two shock absorbers 23 can be mounted to a stationary bracket 24, but lesser or greater numbers may be used. As shown in FIG. 11, the pusher head 20h resides between the bracket 24 and the chute 30 in the "home" configuration. FIG. 13 illustrates the actuation rod 25r extended to push the pusher head 20h forward during an active pushing cycle. The actuation rod 25r is able to slidably extend (and retract) through an aperture in a medial portion of the bracket 24 with at least one shock absorber 23 on each side of the rod 25r facing forward and extending beyond the forward face of the bracket 24.

As shown in FIG. 11, the product pusher mechanism 20 can include an actuator cylinder 20a and associated actuator rod 25r. The actuator 20a can be a tie rod actuator. The pusher mechanism 20 can include at least one 3-way power valve 27, one positioned on each end portion of the actuator cylinder 20a (see FIGS. 1 and 11). The product pusher assembly 20 can also include at least one pressure regulator and an air source in communication with the cylinder 20a. In operation, the pressure regulator can allow the cylinder 21 to operate at up to about 85 psi. The cylinder 20a may be operated at a substantially constant fixed pressure of between about 50-80 psi. In certain embodiments, the pressure is maintained at about 80 psi.

FIG. 11 also illustrates that the system 10 can include a safety gate 75 that automatically travels to close the entry to the chute 30 and reside between the chute 30 and the pusher head 20h when the loading door 31 is open or unlocked. As shown, the gate 75 can reside proximate to but upstream of the loading chute 30. Alternatively, the gate 75 may reside in the chute 30 and travel across via an entry channel formed therein (not shown). The gate 75 is shown as traveling side to side, but may be mounted below or above the chute 30 and travel up or down to close the chute 30 and inhibit entry of the pusher head during loading. The gate 75 may have a substantially planar, unitary body configuration as shown, but other configurations may be used, including a multi-piece configuration, whereby two or more members meet to close the path (not shown). As shown in FIG. 12, the safety gate 75 includes an actuator cylinder 75c with a rod that automatically moves the gate between the extended and retracted positions. The cylinder 75c can be mounted to the system frame 10f. When the loading door 31 is closed, the system 10 can automatically lock the door closed, then automatically retract the gate 75 to allow initiation of the pushing cycle.

Figure 20A:
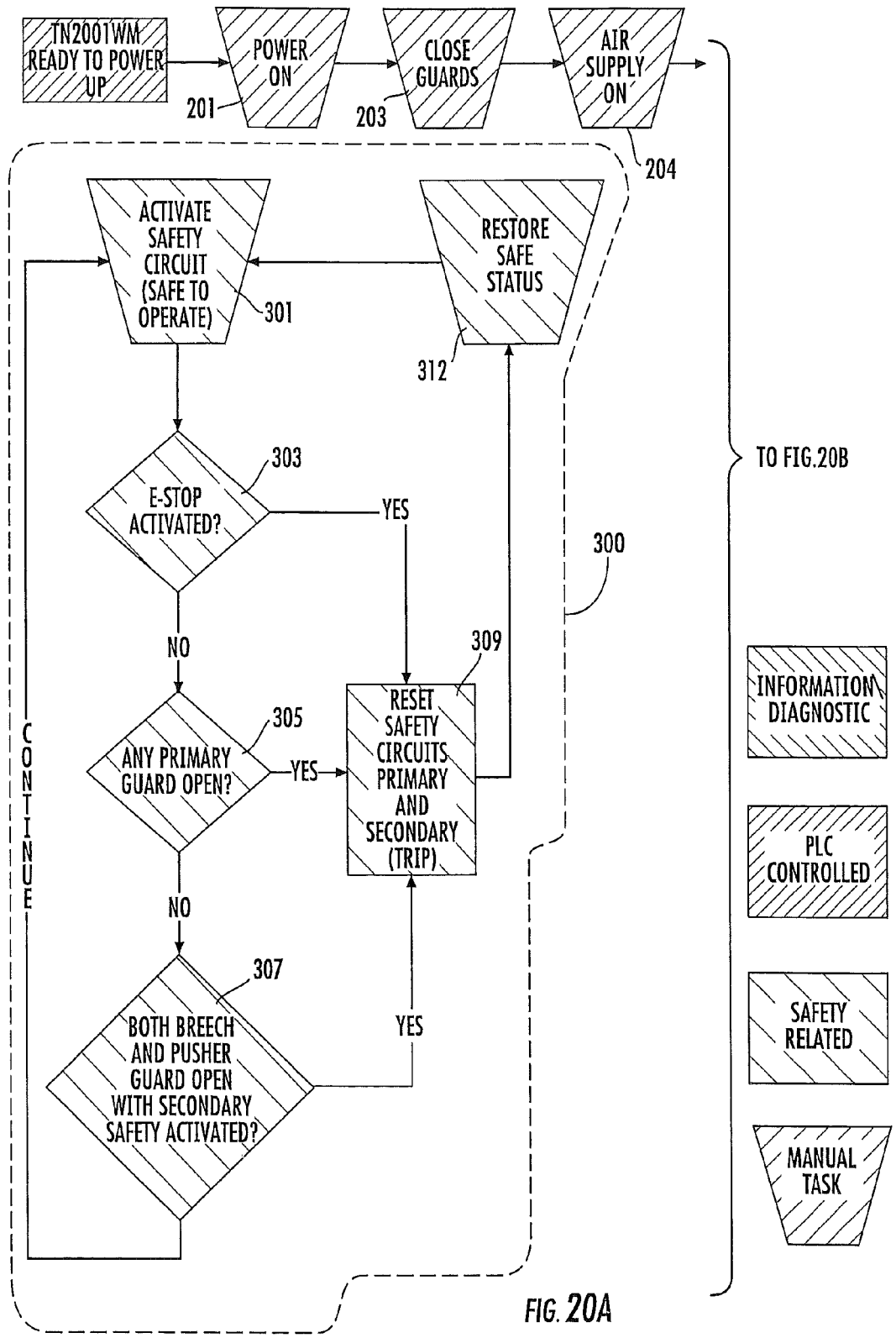
FIGS. 20A-C are operational flow charts of an operational monitoring system with safety and diagnostic features (noted by the legend in FIG. 20A) according to some embodiments of the present invention.
Figure 20B:
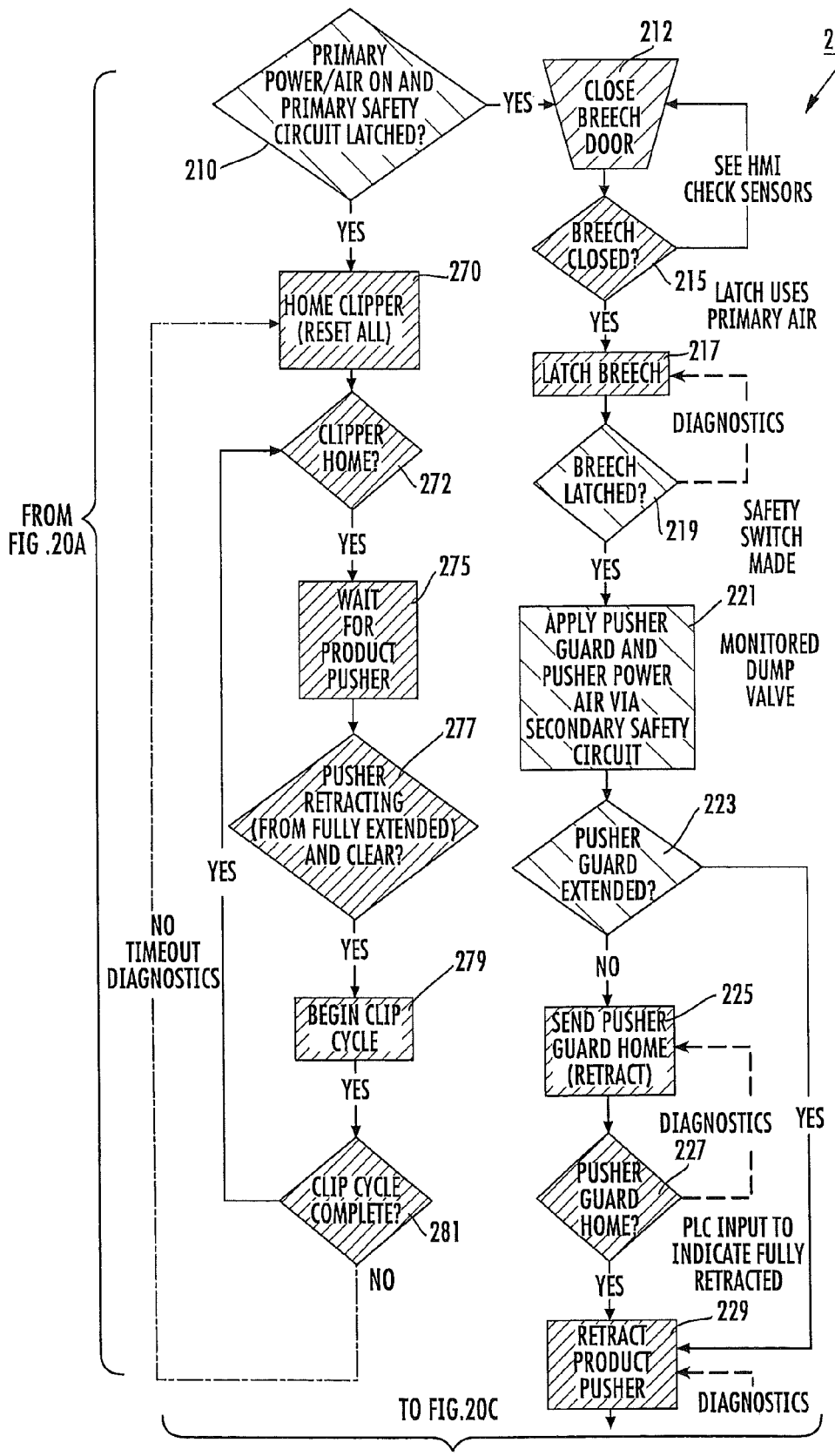
Figure 20C:
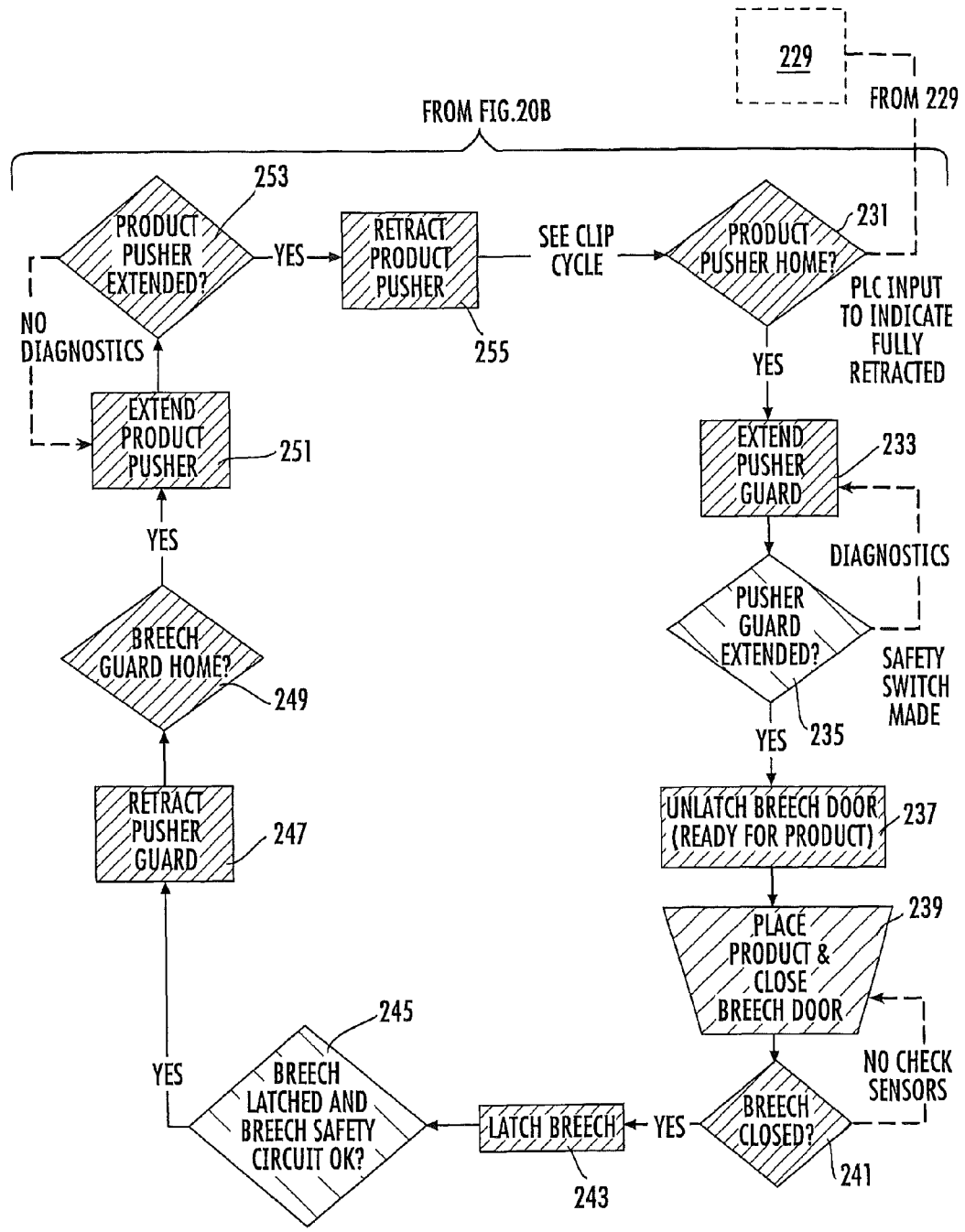

FIGS. 20A-C are flow charts of exemplary operations 200 of a diagnostic and safety monitoring system that may be used with the system 10. The process 300 represented in the broken line box illustrates operations 301-312 that represent continuous safety monitoring operations used with the primary process 200. As shown, the primary process 200 can include operations 201-255 and 210-281. The process 200 can include manual operations 201 (power on to system), 203 (close housing guards), 204 (air supply to "on"), 212 (close breech door), and 239 (place product and close breech door). The broken lines represent diagnostic operations that can be carried out where certain conditions exist. In the operational steps, the term "breech" refers to the (side) entry loading chute door. Many of the operations are carried out under PLC control. That is, a controller/processor (such as a Programmable Logic Controller) may be configured to automatically monitor operational status and conditions through a Safety Circuit Module. For example, if the product chute 35 is missing or out of position, the apparatus 10 can be held in a low energy state that removes power to air supplies and controls to inhibit machine operation. To reinitiate the procedure, an operator may press a restart or reset button. Once the product chute 35 is in location and the stop is reset, power/air can be applied to the machine control valves and electric power can be applied to the control (PLC) outputs. After the PLC determines the positions of the moveable components, such as the product pusher assembly 20, the clipper 50, the loading door 31 and the like, an automatic reset can be performed and those components automatically moved to a respective home position as needed.

Figure 21:
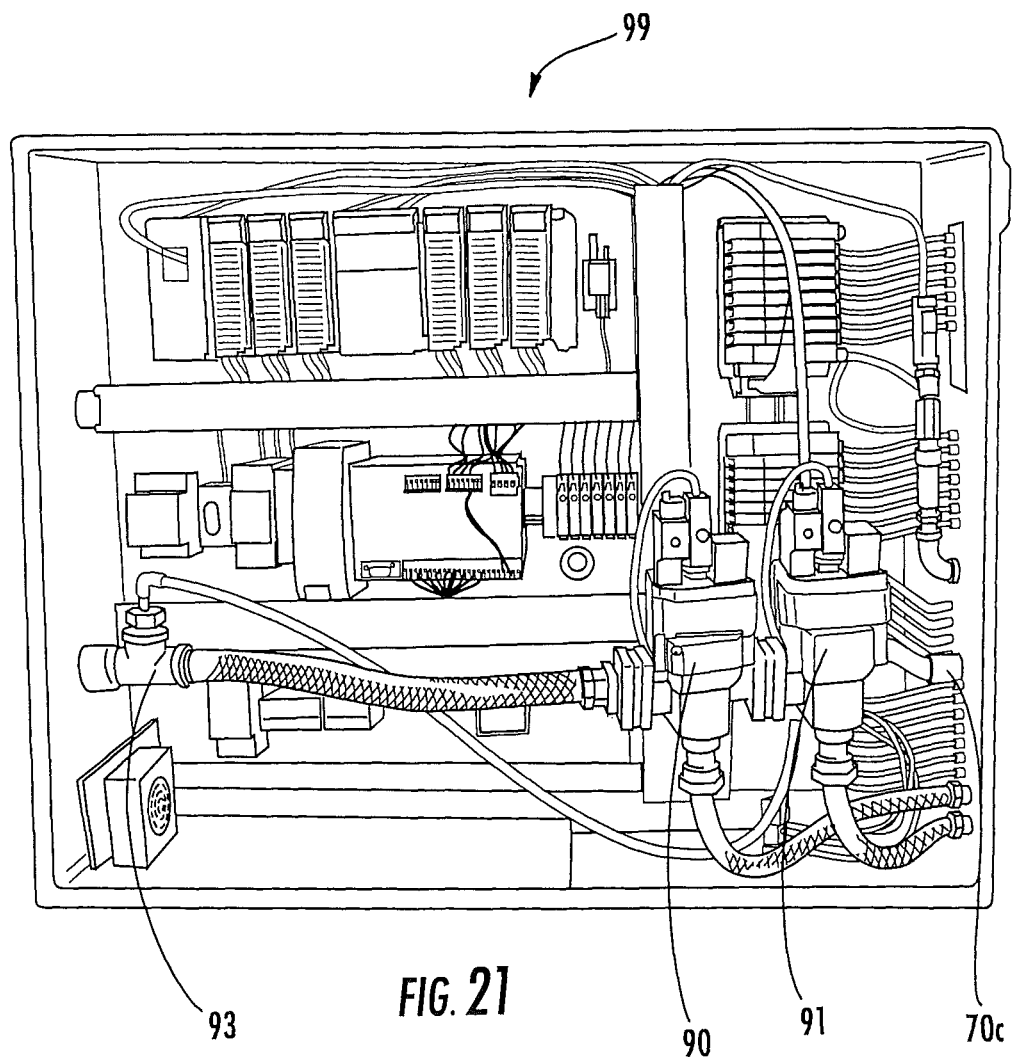
FIG. 21 is a side view of a control unit with dual safety valves to monitor the system air supply according to embodiments of the present invention.

FIG. 21 illustrates that the system 10 can include in-line first and second (dual) safety valves 90, 91 in communication with the pressurized air supply 93 and a safety monitoring circuit 70c in communication with a controller associated with the HMI and/or PLC. The system 10 can be configured to monitor both valves 91, 93 and cut-off or disable system operation if one of the valves 91, 93 fails.

As shown in FIG. 21, a control housing 99 can hold system valves, pressure transducers, actuator controls, a processor that directs the automated operations of the apparatus 10 which may also be held in total or partially in the HMI 70 and other electronic, software and/or mechanical equipment as will be understood by one of skill in the art. The HMI 70 (FIGS. 1, 2) may include a touch screen interface/user input.

Summarizing some embodiments, the system places the gate 75 between the pusher head 20h and chute 30 before an operator is able to open the loading door 31. Once opened, the operator loads discrete whole muscle pieces (or other product) into the loading chute 30, and then closes the door 31. The system 10 automatically closes and locks the door 31, retracts the gate 75, and initiates the pushing cycle. The pusher head 20h pushes whole muscle out of the chute 35 and into netting. The clipper 50 applies clips while the pusher head is retracted. Once the pusher head clears the chute 30, the gate is extended and the door 31 is unlocked and opened, ready for an operator to reload the next set of whole muscle meat pieces in cavity.

Figure 22:
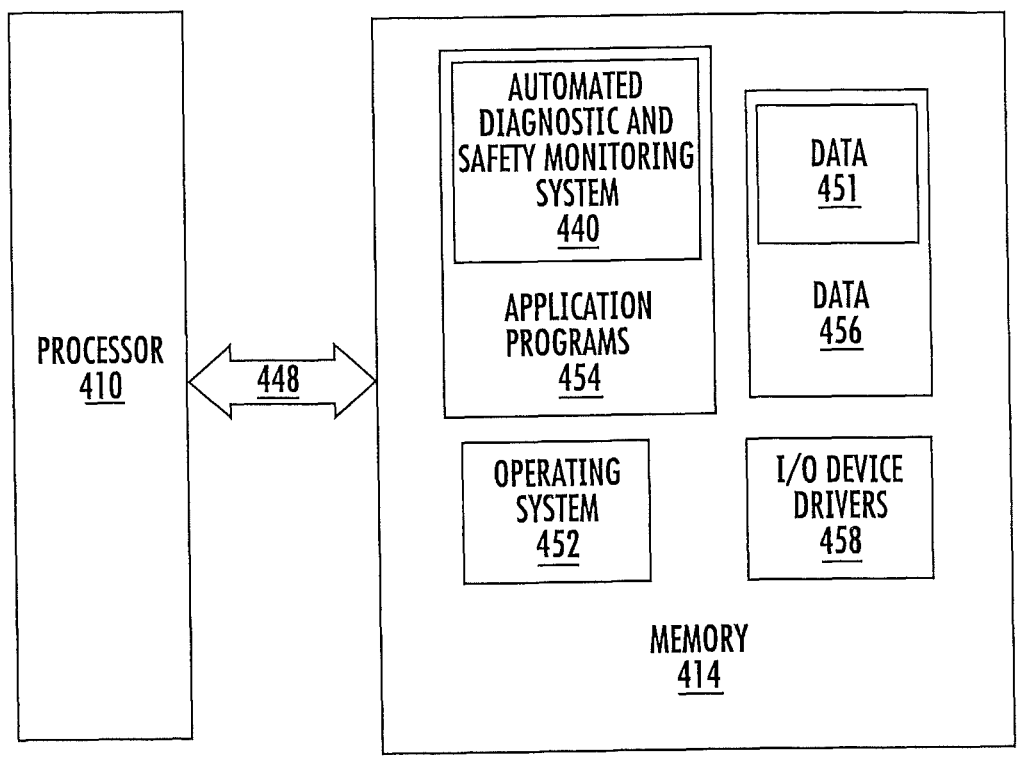
FIGS. 22 and 23 are block diagrams of data processing systems/computer programs according to embodiments of the present invention.
Figure 23:
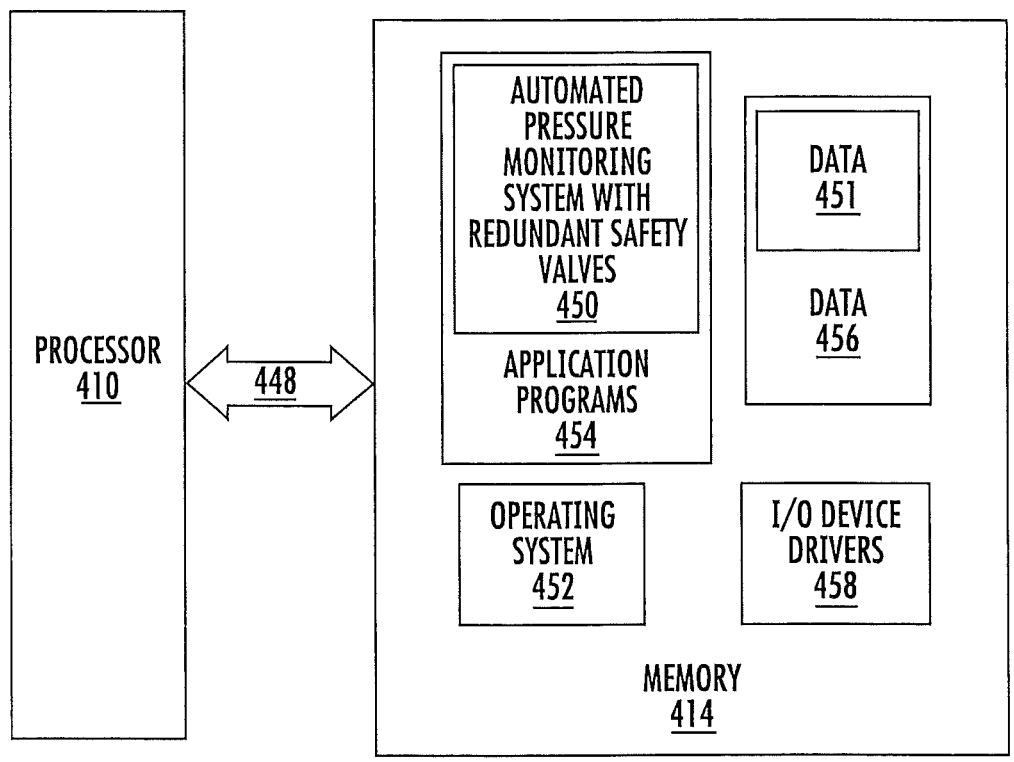

FIGS. 22-23 are block diagrams of exemplary embodiments of data processing systems that illustrate systems, methods, and computer program products in accordance with embodiments of the present invention. The data processing systems may be incorporated in a programmable logic controller and/or digital signal processor in communication with the HMI. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIGS. 22 and 23, the memory 414 may include several categories of software and data used in the data processing system: the operating system 452; the application programs 454; the input/output (I/O) device drivers 458; the Automated Diagnostic and Safety Monitoring Module 440 (FIG. 22) which may include or be in communication with the Automated Pressure Monitoring System with Redundant Safety Valves Module 450 (FIG. 23); and the data 456.

The data 456 may include a look-up chart of different products, covering material, proximity sensor feedback, pressure data, safety interlock circuits and the like 451 corresponding to particular or target products for one or more producers, which may allow additional force to cut the gathered material and/or time the cutting to a desired cycle for a shift and/or production run and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Modules 440, 450 being application programs in FIGS. 22 and 23, as will be appreciated by those of skill in the art, other configurations may also be utilized while still benefiting from the teachings of the present invention. For example, the Modules 440, 450 may also be incorporated into the operating system 452, the I/O device drivers 458 or other such logical division of the data processing system. Thus, the present invention should not be construed as limited to the configurations of FIGS. 22, 23, which is intended to encompass any configuration capable of carrying out the operations described herein. Further, the Modules 440, 450 can be used to operate other apparatus that may employ other chutes, discharge tables and/or clipper types.

The I/O data port can be used to transfer information between the data processing system, the product pusher, and the closure attachment mechanism or another computer system or a network (e.g., the Internet) or to other devices controlled by the processor. These components may be conventional components such as those used in many conventional data processing systems which may be configured in accordance with the present invention to operate as described herein.

For example, certain embodiments of the present invention are directed to a computer program product for operating an automated clipped (netting) packaging apparatus so that the clipper mechanism operates from either a left or right hand side. The computer program product can include computer readable program code that allows a user to select linked or non-linked packages and sizes, as well as, for example, left hand or right hand clipping mechanism operation, which may be programmed or selected at the OEM site. That is, the controller may have several program sequences, one for each target product, and also one for operating left hand operation and one for right hand operation (for either or both the handle-maker and/or clipper). During assembly and/or test, an OEM site can lock in the proper operational sequence. In other embodiments, the program is indifferent to which mounting orientation is used and, as such, a common program can be used to operate the apparatus irrespective of which mounting orientation is employed.

The automated/semi-automated packaging apparatus can include an automated product pusher mechanism that advances and retracts from a product chute and an automated clipping apparatus that applies at least one closure clip to netting present there. The computer program product can include: (a) computer readable program code that automatically and controllably actuates a pusher actuation cylinder to push a product pusher in a downstream direction; and (b) computer readable program code that automatically and controllably actuates a clipper mechanism to position a clipping apparatus in a clipping position in response to, product pushed by the product pusher out of the product chute and covered in netting.

In particular embodiments, the computer program product can also include one or more of: (a) computer readable program code that automatically and controllably actuates netting gathering gate actuation cylinders to laterally translate the gates toward the clipper mechanism; (b) computer readable program code that automatically and controllably actuates a package holding member to maintain a product held in netting in alignment with the clipper mechanism; (c) computer readable program code that monitors a proximity sensor positioned to detect when a product is loaded in the chute with the loading door closed, then automatically and controllably removes the safety gate and actuates the pusher cylinder in response thereto; (d) computer readable program code that prevents actuation of the pusher cylinder when the product chute is not in proper position; (e) computer readable program code that actuates a cutting tool actuation cylinder to controllably advance the cutting tool and automatically sever netting intermediate two clips thereon; (f) computer readable program code that automatically actuates clip pushers in the clipper mechanism when netting is gathered and in position for clipping at the clipping window; (g) computer readable program code that controls the actuation of a braking mechanism to advance the braking mechanism to contact the product chute and selectively apply pressure to netting thereat; (h) computer readable program code that automatically and controllably actuates the pusher actuation cylinder to pull a product pusher in an upstream direction out of the product chute; and (i) computer readable program code that automatically and controllably actuates the safety gate to reside between the loading chute and the pusher head during the clipping cycle.

While the present invention is illustrated, for example, with reference to particular divisions of programs, functions and memories, the present invention should not be construed as limited to such logical divisions. Thus, the present invention should not be construed as limited to the configurations of FIGS. 22 and 23 but is intended to encompass any configuration capable of carrying out the operations described herein.

The flowcharts and block diagrams of certain of the figures herein illustrate the architecture, functionality, and operation of possible implementations of safety and/or diagnostic systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer program product for operating an automated or semi-automated packaging system with axially aligned first and second product chutes, the computer program product comprising:

a non-transient computer readable storage medium having computer readable program code embodied in said medium, said computer-readable program code comprising:

computer readable program code that monitors at least one signal from respective first and second safety valves in communication with pressurized air supplied to the packaging system that includes a plurality of pneumatic actuation members; and computer readable program code that automatically cuts off the pressurized air to the system if one or both of the safety valves is determined to be inoperable based on the monitored signals.

2. The computer program product of claim 1, further comprising computer readable program code that directs an actuator in communication with a pusher mechanism to cause the pusher mechanism to reciprocate through the first and second aligned product chutes to automatically push at least one target object therethrough; and computer readable that directs an automated clipper to apply at least one clip to netting material that encases the at least one target object after it exits the product chutes to secure the at least one object in the netting material.

3. The computer program product of claim 2, wherein the first product chute is a loading chute with a ceiling that opens to allow a user access to an internal cavity of the loading chute, wherein the computer program product further comprises computer readable program code that directs an actuator to automatically lock the ceiling closed before allowing the pusher mechanism actuator to translate to enter the loading chute.

4. The computer program product of claim 3, further comprising an actuator that extends and retracts a barrier gate between the loading chute and the pusher mechanism, the computer program product comprising computer readable program code that directs the actuator to extend the barrier gate when the ceiling is open and to retract the barrier gate after the ceiling is locked.

5. The computer program product of claim 4, wherein the computer readable program code that directs the actuator to cause the pusher mechanism to travel through the first and second chutes is configured to hold the pusher mechanism behind the barrier gate until the ceiling is locked and the barrier gate has been retracted.

6. The computer program product of claim 1, further comprising computer readable program code the directs a product pusher with a pusher head to retract from the first and second chutes and compress shock absorbers to reduce forces applied to the pusher mechanism as the pusher head approaches a home position.

7. The computer program product of claim 1, wherein the system includes a netting chute residing about a second one of the product chutes, and wherein the computer program product comprises computer readable program code that selectively allows the netting chute and the second product chute to be pivoted in concert, while concentrically aligned, to a position that is between about 30-60 degrees away from an axial in-line centerline to load a sleeve of netting material onto the netting chute.

8. The computer program product of claim 1, further comprising computer readable program code that directs a clipper to serially clip different sets of whole muscle pieces into different chubs of netting with the clipped whole muscle arranged into an elongate length of at least two attached clipped sets of whole muscle pieces.

9. The computer program product of claim 1, further comprising computer readable program code that selectively allows one of the product chutes to pivot to a position that is between about 30-160 degrees offset from an in-line configuration but proximate to a side of the other product chute.

10. The computer program product of claim 1, wherein one of the product chutes is a loading chute with a pivotably attached loading door, the computer program product further comprising computer readable program code configured to automatically controllably lock the loading door closed in response to closure of the loading door to inhibit a user from opening the loading door once a product pusher is activated and/or in motion.

* * * * *